(12) United States Patent
Yamada et al.

(10) Patent No.: US 7,222,970 B2
(45) Date of Patent: May 29, 2007

(54) LAMP UNIT AND PROJECTION-TYPE DISPLAY APPARATUS

(75) Inventors: Kazuhiro Yamada, Ome (JP); Teruyuki Morimoto, Kumagaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 149 days.

(21) Appl. No.: 11/087,334

(22) Filed: Mar. 23, 2005

(65) Prior Publication Data

US 2005/0243285 A1    Nov. 3, 2005

(30) Foreign Application Priority Data

Apr. 28, 2004    (JP)    ............... 2004-134502

(51) Int. Cl.
*G03B 21/16*  (2006.01)
*G03B 21/18*  (2006.01)
*G02F 1/1333* (2006.01)
*H04N 5/74*   (2006.01)
*F21V 29/00*  (2006.01)
*F21V 7/20*   (2006.01)
*F21V 21/00*  (2006.01)

(52) U.S. Cl. .................... 353/61; 353/60; 349/161; 348/748; 362/264; 362/294; 362/345; 362/374

(58) Field of Classification Search .............. 353/52, 353/57, 58, 60, 61; 349/161; 348/748; 362/580, 362/547, 264, 294, 345, 373
See application file for complete search history.

(56) References Cited

U.S. PATENT DOCUMENTS 7,048,387 B2*  5/2006  Wei et al. .................... 353/99
7,052,147 B2*  5/2006  Katsuma et al. ............ 353/119

FOREIGN PATENT DOCUMENTS

JP    2002-365729    12/2002
JP    2003-069923    3/2003

* cited by examiner

*Primary Examiner*—W. B. Perkey
*Assistant Examiner*—Rochelle Blackman
(74) *Attorney, Agent, or Firm*—Blakely Sokoloff Taylor & Zafman, LLP

(57) ABSTRACT

According to one embodiment, a lamp unit comprises a light source lamp, a casing and a dividing member. Configured to hold the light source lamp, the casing comprises a first opening as an inlet port where cooling air is fed from the outside to the light source lamp. The dividing member is provided in the vicinity of the second opening of the casing and is configured to divide the flow of the cooling air into the second opening into at least two paths.

17 Claims, 14 Drawing Sheets

LAMP UNIT AND PROJECTION-TYPE DISPLAY APPARATUS

CROSS-REFERENCE TO RELATED APPLICATIONS

This application is based upon and claims the benefit of priority from prior Japanese Patent Application No. 2004-134502, filed Apr. 28, 2004, the entire contents of which are incorporated herein by reference.

BACKGROUND

1. Field

Embodiments of the present invention relates to a lamp unit to be used for a general projection-type display apparatus.

2. Description of the Related Art

As is well known, a projection-type liquid crystal TV, a liquid crystal projector, a DLP projector and other types of protection-type display apparatus require high luminance output in order to produce vivid picture images. Therefore, these types of display apparatus are normally implemented with lamp units capable of such high luminance output.

According to a light source unit (a lamp unit) to be used for such a projection-type display apparatus, in a lamp unit casing of a substantial box shape to store a light source lamp, a face (an output face) on which a light source is reflected on a reflector and is outputted is opened, and a rear face opposed to this output face is also opened (it is referred to as a rear opening face). In other words, the light source unit is shaped in a tubular shape, of which front and rear parts on an optical axis are opened.

In addition, a reflector and a front glass are held by a glass holder, and in an opening of the output face, a front part of this glass holder (a part where the front glass is fit) is engaged so that no air leaks from the front face. The light source lamp is incorporated in the reflector. According to such a lamp unit, an increase in luminance output causes an increase in the operating temperature of the light source lamp, so that cooling air is necessarily supplied to a heat generation portion from the outside.

In Jpn. Pat. Appln. KOKAI Publication No. 2002-365729, as a conventional art with respect to such a problem, the reflector of the lamp unit is positively cooled by an exhaust fan. In other words, providing an inflow hole and an outflow hole and using a fan, rising of a temperature of the reflector can be positively prevented.

In this Jpn. Pat. Appln. KOKAI Publication No. 2002-365729, only the rising temperature of the reflector is prevented. Such teachings do not address the regulation and control of rising temperatures on the light source lamp or the front glass on which filter processing is applied.

BRIEF DESCRIPTION OF THE SEVERAL VIEWS OF THE DRAWING

The features and advantages of the embodiments of the invention will become apparent from the following detailed description of the invention in which:

FIG. 11 is a perspective view of an exemplary embodiment of the lamp unit for explaining a flow of cooling air there through;

DETAILED DESCRIPTION

Figure 1:
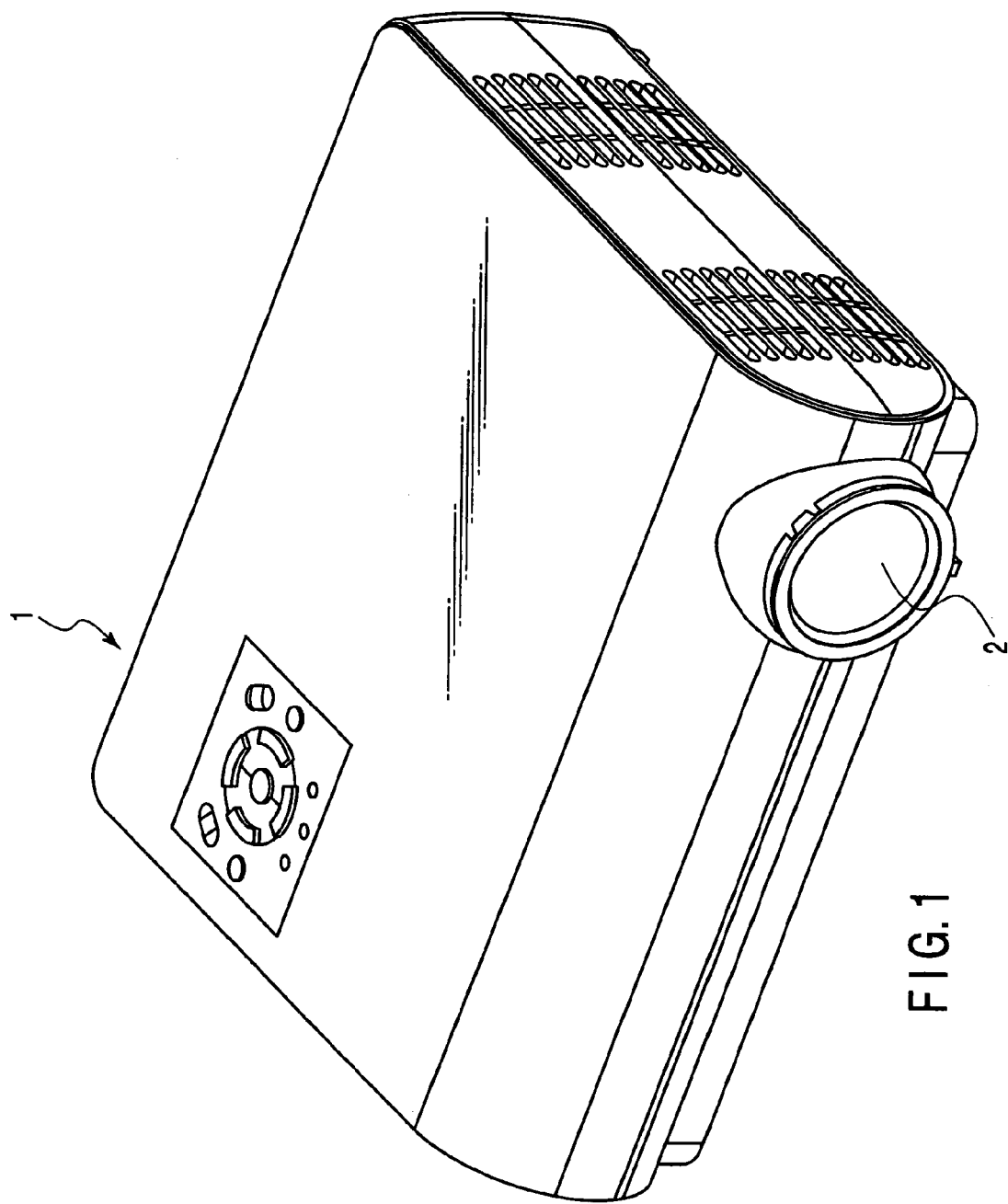
FIG. 1 is a perspective view of an exemplary embodiment of a projector-type display apparatus.
Figure 2:
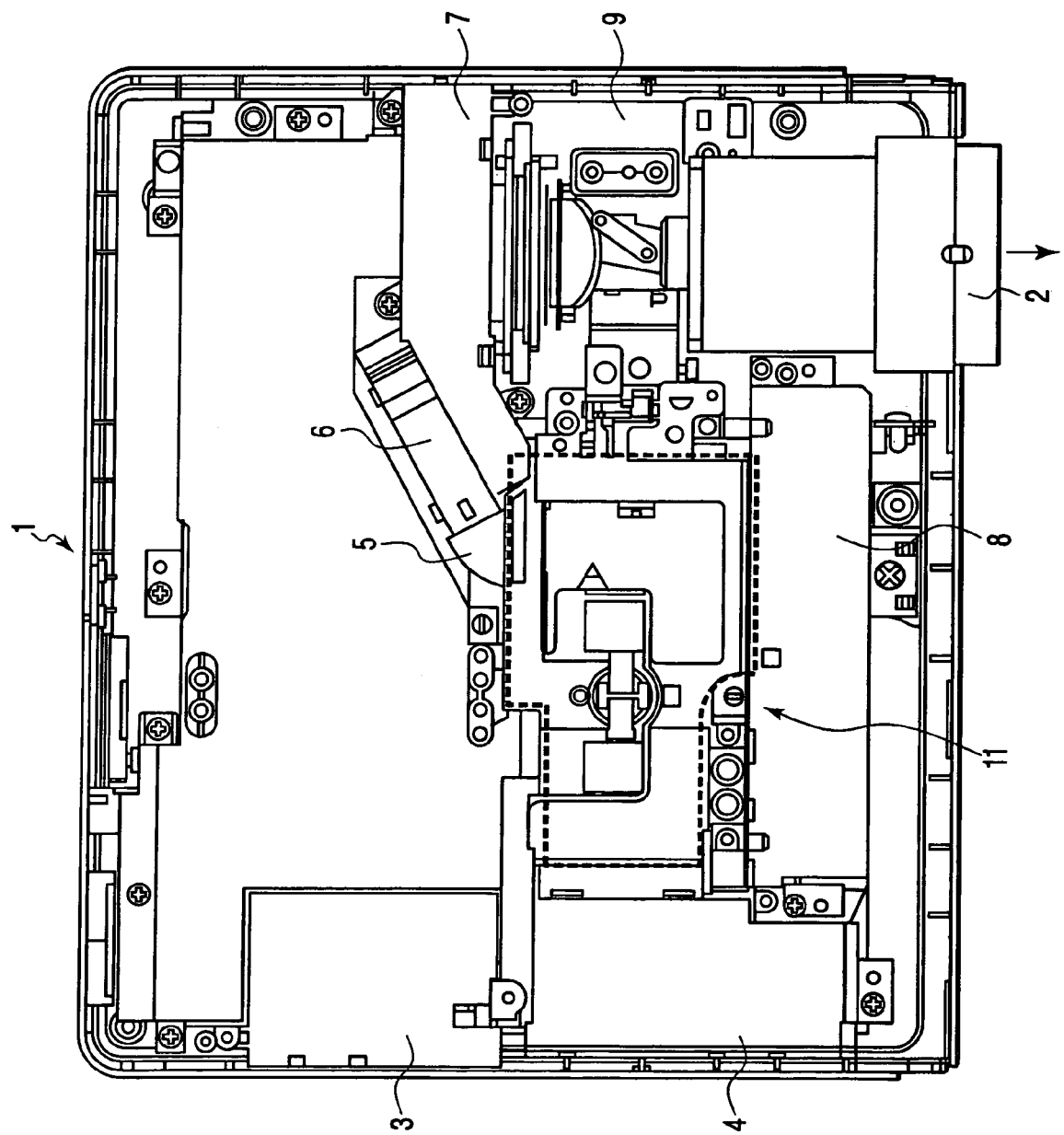
FIG. 2 is an exemplary embodiment of an inner structure of the projector-type display apparatus.
Figure 3:
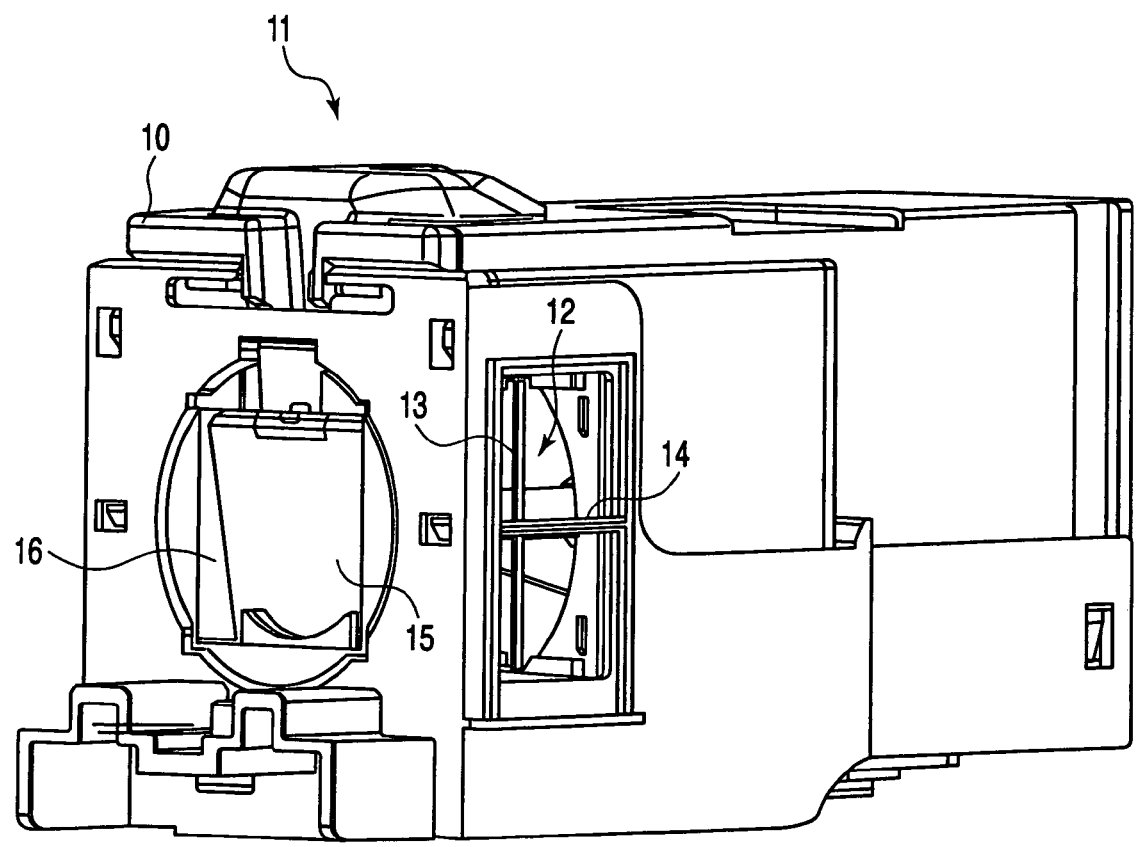
FIG. 3 is an exemplary embodiment of a lamp unit for the projector-type display apparatus of FIG. 1.
Figure 5:
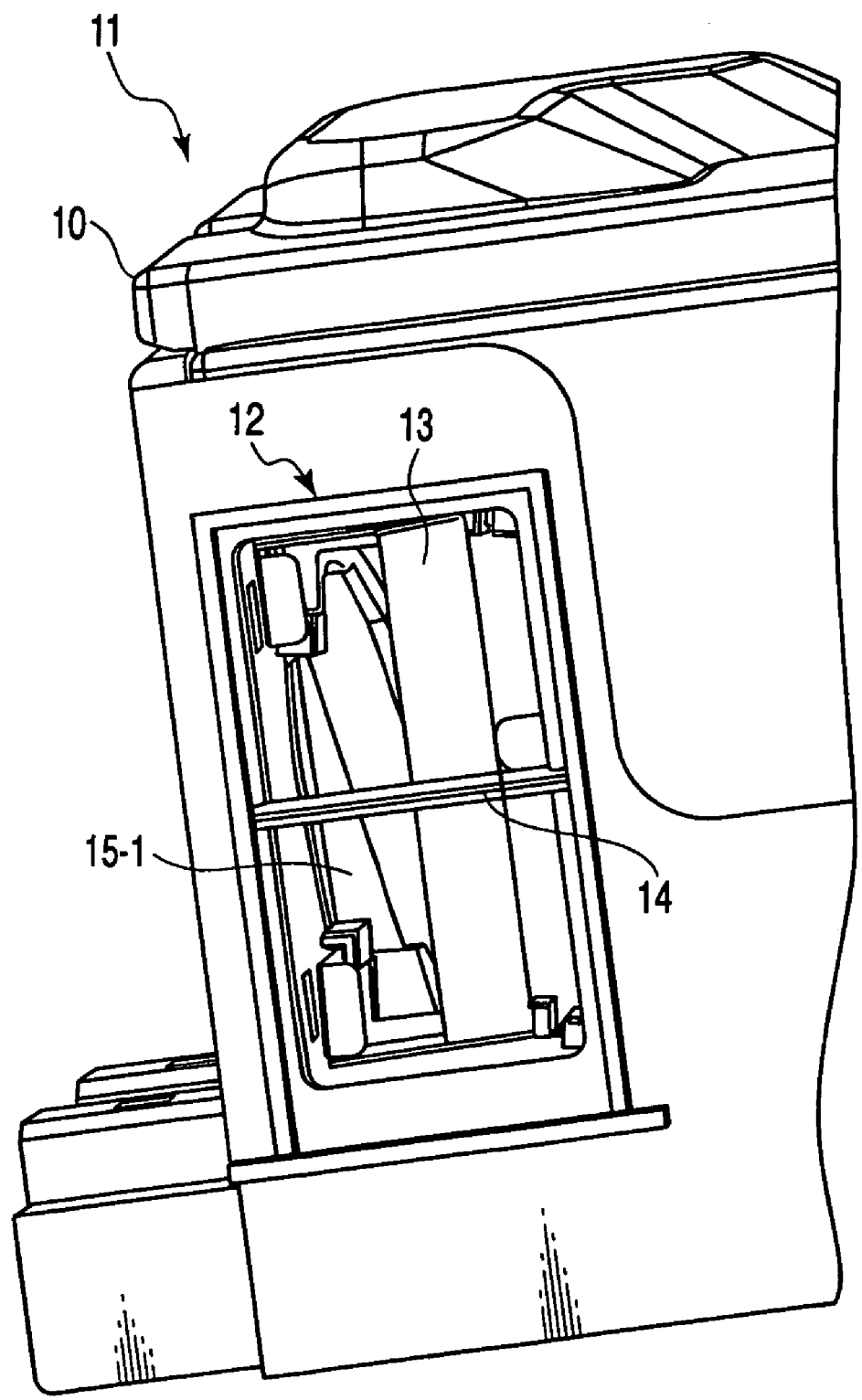
FIG. 5 is an exemplary embodiment of an opening hole of the lamp unit for the projector-type display apparatus of FIG. 1.
Figure 6:
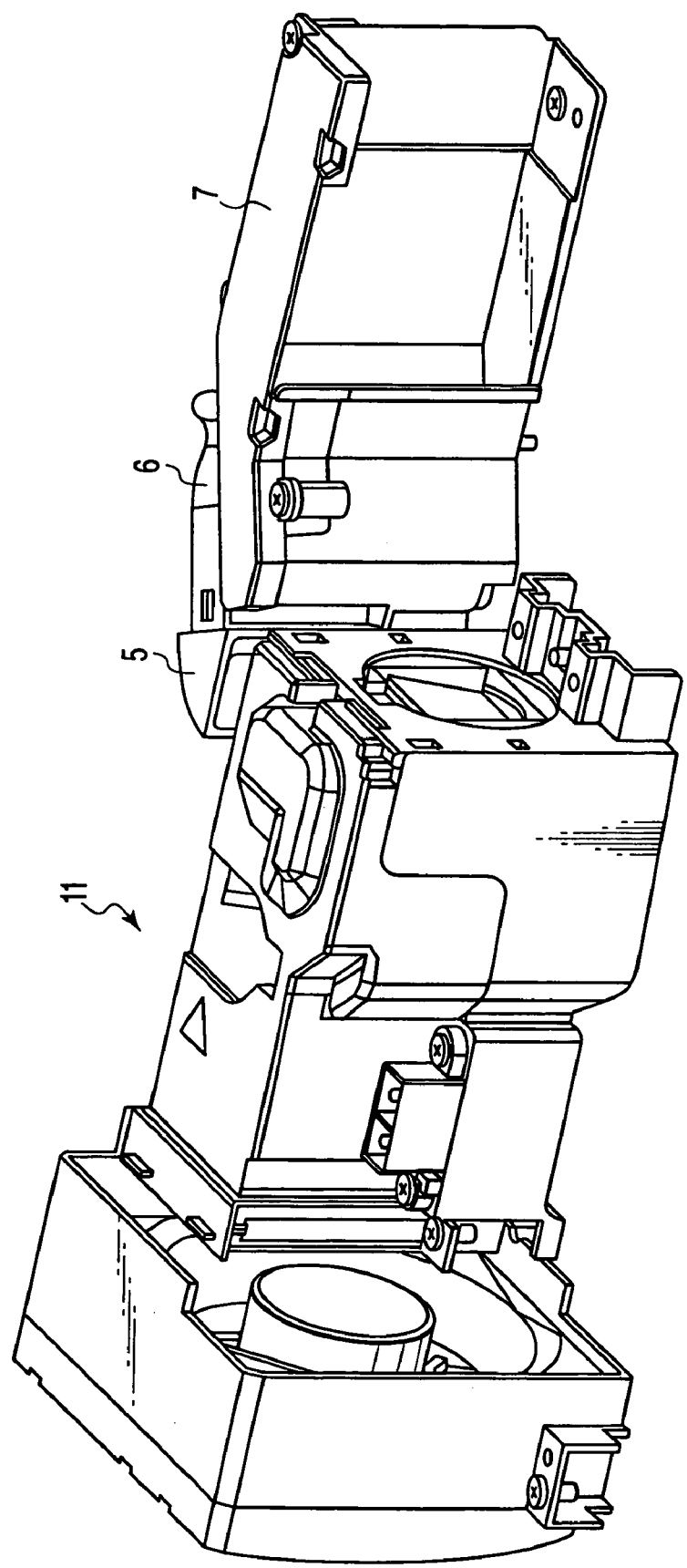
FIG. 6 is a first perspective view of exemplary embodiments of the lamp unit connected to a duct unit.
Figure 7:
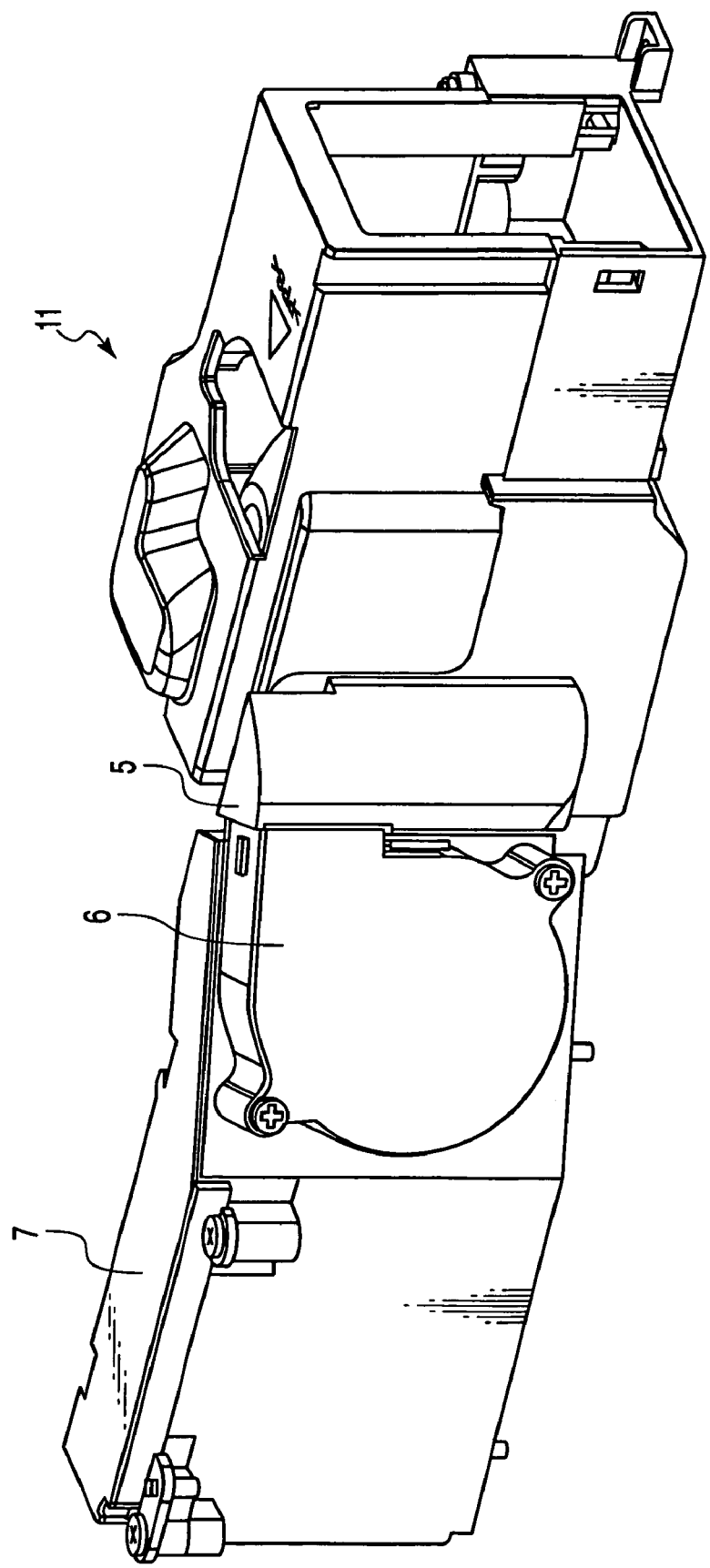
FIG. 7 is a second perspective view of exemplary embodiments of the lamp unit and the duct unit shown in FIG. 6.
Figure 8:
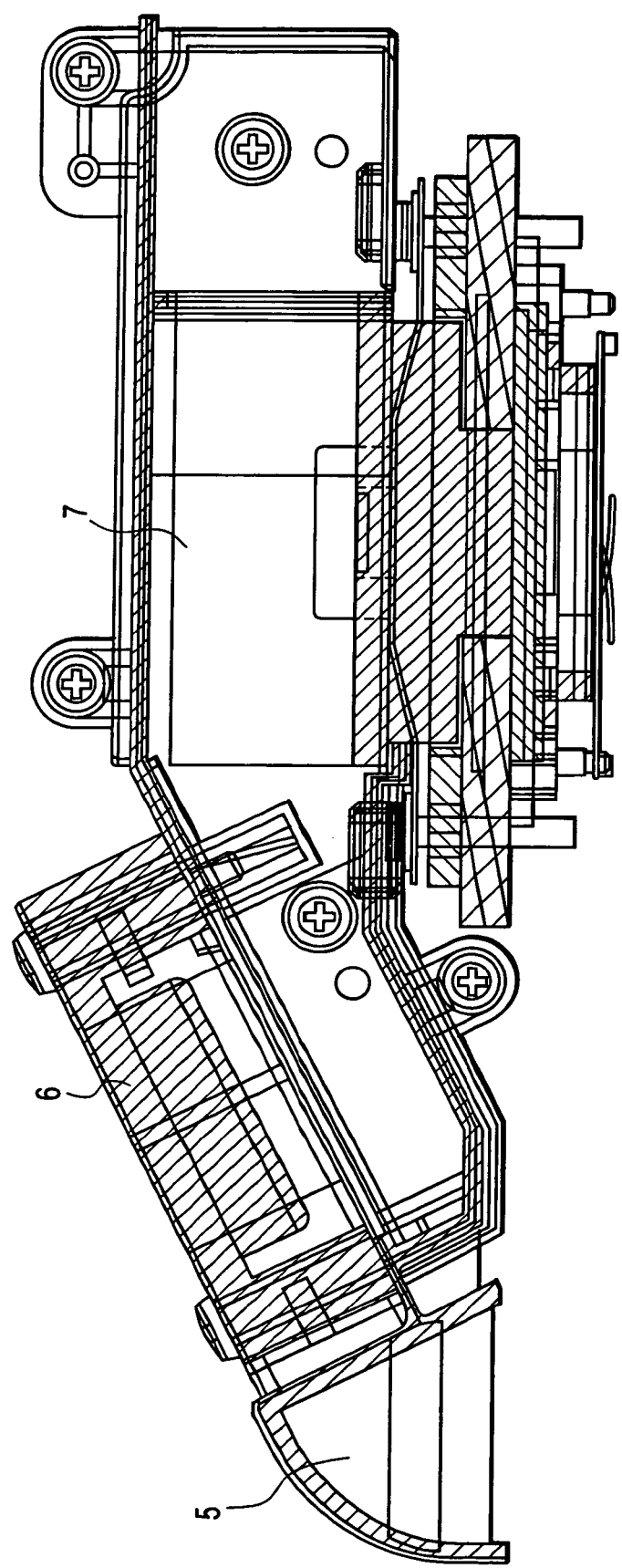
FIG. 8 is a detailed exemplary embodiment of view the duct unit of FIG. 6.

Hereinafter, an embodiment of the present invention will be described in detail with reference to the drawings. FIG. 1 is an outside view for showing a projector apparatus according to the present embodiment, FIG. 2 is a view of for showing an inner structure of the projector apparatus, FIG. 3 is a view for showing a lamp unit of the projector apparatus, FIG. 4 is a view for showing an air direction element of the lamp unit, FIG. 5 is a view for showing an opening hole of the lamp unit, FIG. 6 is a perspective view for showing connection between the lamp unit and a duct unit, FIG. 7 is a perspective view for explaining connection between the lamp unit and the duct unit according to the embodiment, and FIG. 8 is a view for showing the duct unit.

I. Projection-Type Display Apparatus Architecture

Hereinafter, the lamp unit according to one embodiment of the present embodiment will be described in detail with reference to the drawings, for example, when this is applied to a general projection-type display apparatus such as a projection-type liquid crystal television, a liquid crystal projector, a digital light processing (DLP) projector or the like.

As shown in FIG. 1, the projection-type display apparatus according to the present embodiment is, for example, a projector apparatus 1 incorporating the lamp unit therein and having a projection lens 2 for projecting an optical image acquired by passing the light from a light source lamp in the lamp unit to a display unit displaying a picture image in accordance with a picture image signal to be supplied.

In other words, in FIG. 2, the projector apparatus 1 comprises a power source ventilation fan holder 3, an optical peripheral ventilation fan holder 4, a lamp unit 11 adjacent to this ventilation fan holder 4 for generating a light source when power is supplied from a power source unit 8.

The projector apparatus 1 further comprises an optical portion 9 for irradiating, to a projection lens 2, an optical image which is acquired by reflecting and passing light from the lamp unit to display a picture image in response to the given picture image signal. The lamp unit 11 and a projection lens 2, being a projection portion that may further include a lens mirror tube for receiving an optical image from the optical portion 9 and projecting it.

In addition, the lamp unit 11 may employ a system for cooling the inside of the lamp unit 11 by feeding air into an opening 12 as an intake port at the side of the lamp unit 11 and discharging air from an opening 19 at the rear side of the lamp unit 11. In this case, as shown FIG. 2 and FIGS. 6 to 8, compulsorily taking in the cooling air from a fan duct 7 that is directly connected to the outside by rotation of a fan 6, the cooling air is fed from the opening 12 at the side of the lamp unit 11 via a lamp intake duct 5.

In addition, if the air speed and the air volume provided by a flow of air that is compulsorily fed in the opening 12 at the side of the lamp unit 11 is not sufficient, it is contemplated that the sufficient air speed and air flow are obtained by discharging air from the opening 19 at the rear side of the lamp unit 11 by using a compulsory exhaust fan.

II. Lamp Unit Architecture

As shown in FIGS. 3 to 5 and 9, the lamp unit 11 is configured so that a casing 10 encloses a light source lamp 20. The lamp unit 11 includes the opening 12 at a first side operating as the intake port and an opening 24 at a second side, which is opposite the first side and operates as the discharge port.

Figure 9:
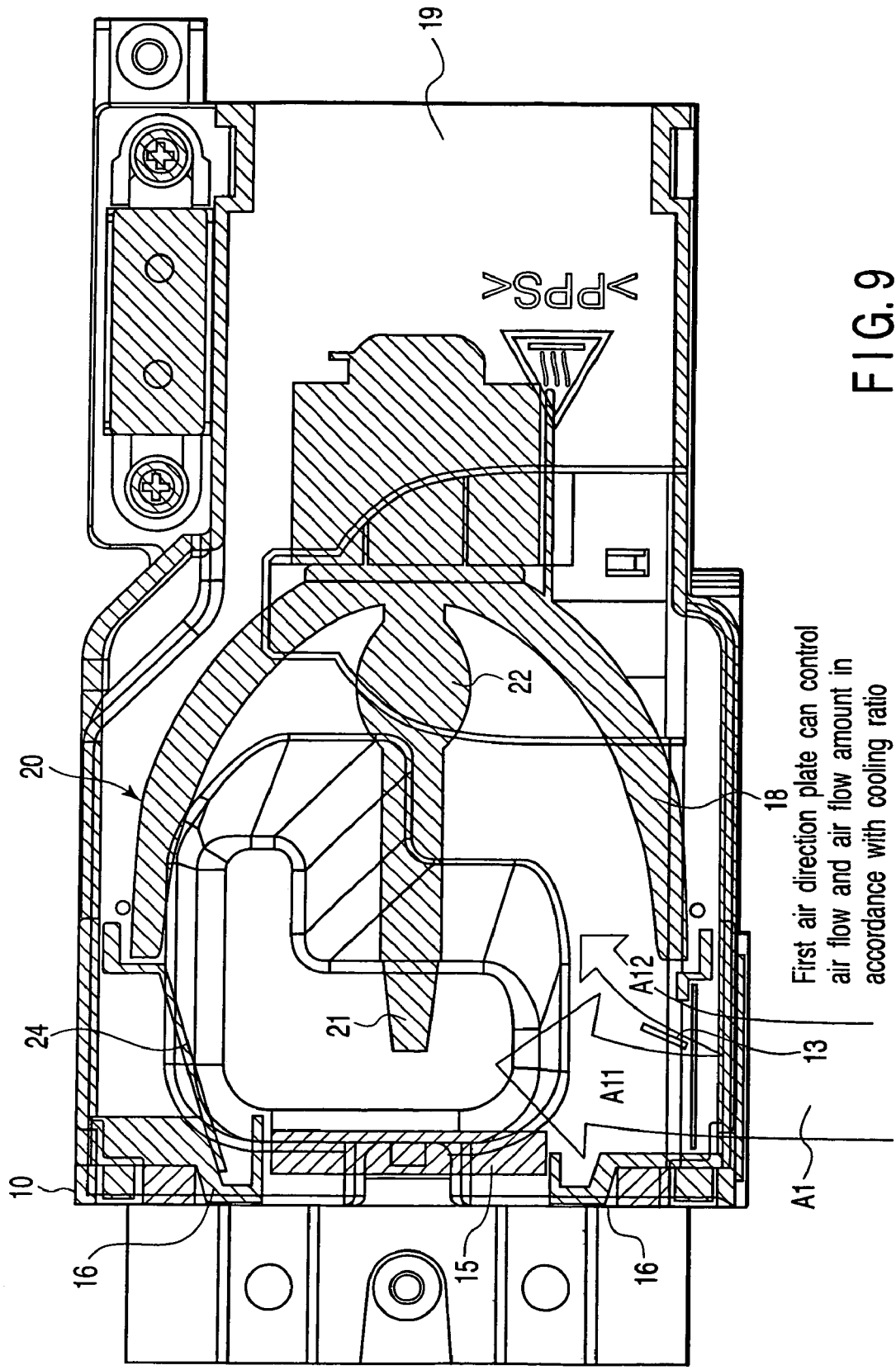
FIG. 9 is an exemplary embodiment of a flow of cooling air in the lamp unit.

Then, as shown in FIG. 9, the light source lamp 20 is configured by an end portion 21 of the lamp unit 11 and a leg portion 22. The end portion 21 may burst unless it is cooled and maintained in a predetermined temperature range, such as 300° C. to 400° C. for example. Hence, temperatures of the end portion 21 and a reflector 18 are controlled to remain about 400° C. and below in temperature, depending on a lamp ability and a duration of life. In addition, the leg portion 22 may be controlled to remain at a different temperature range such as 700° C. to 900° C.

In addition, the lamp unit 11 has a first air direction element 13 and a second air direction element 14 or the like to be described later. Further, a front glass 15 as a glass member is held by a glass holder 16. This front glass 15 is provided with a UV/IR filter reflecting unnecessary ultraviolet ray and infrared ray among light from the light source lamp 20 and only passing a visible light therethrough.

A temperature of this front glass 15 is desirably controlled not more than about 200° C., however, in the vicinity of the front glass, a peripheral temperature becomes 300° C. and over in the vicinity of a point where the light from the light source lamp 20 is focused. If the temperature becomes 200° C. and over, a membrane on the front glass 15 peels and falls, causing a problem such as a crack or the like, so that a temperature of the front glass 15 is desirably controlled to be lower than that of the light source lamp.

In addition, as shown in FIG. 3, the front glass 15 is inclined so that its glass face does not intersect with a direction of the light from the light source lamp at a right angle. Thus, when the light from the light source lamp 20 is reflected on the front glass 15 to return, it is prevented to focus (become an abnormally high temperature) in the vicinity of the lamp end portion 21.

Thus, it is not always preferable that the inside of the lamp unit 11 is cooled uniformly, and the optimum temperature is decided depending on a portion, so that it is not always preferable to feed the cooling air from a cooling fan. In addition, an air speed, an air direction, and an air amount of the cooling air are not always decided from a simple model because a swirl is generated inside of the lamp unit 11 where the light source lamp 20 and the front glass 15 are located in a narrow space. Accordingly, it is important to finely adjust the air speed, the air direction, and the air amount of the cooling air, for example, by the above-described air direction elements 13 and 14 or the like.

III. Air Direction Element of Lamp Unit and Flow of Cooling Air

Hereinafter, an example of a dividing member and an operational advantage for controlling the cooling air within the lamp unit 11 will be described in detail below.

A. First Air Direction Element 13

As a dividing member for controlling the cooling air inside of the lamp unit 11, first, as shown in FIG. 3, and FIGS. 4A to 4C, the first air direction element 13 may be configured as a plate (or a bar member) and provided inside the casing 10. According to one embodiment of the invention, first air direction element 13 is oriented perpendicular to the direction that light is illuminated from the light lamp 20.

Figure 10:
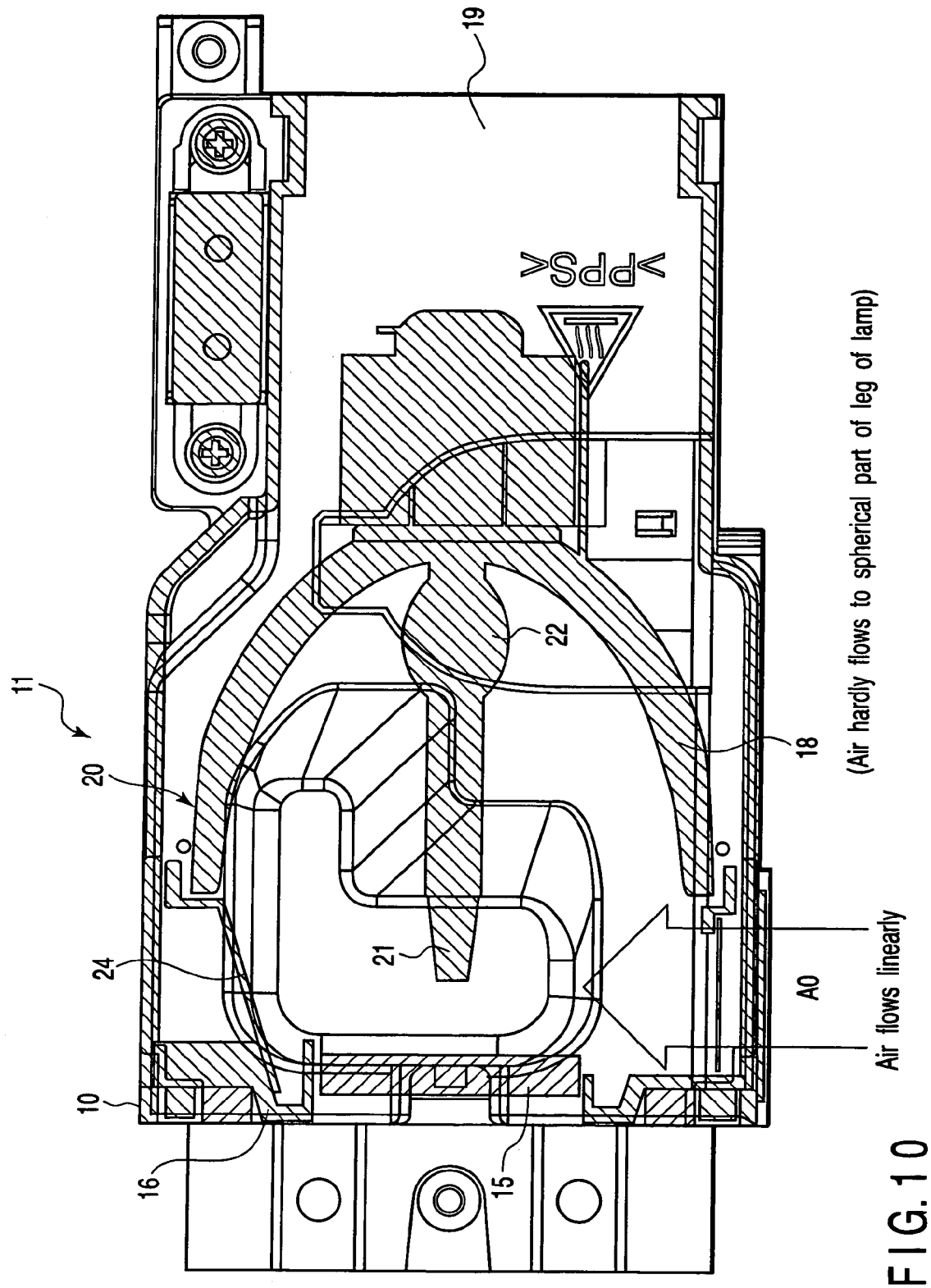
FIG. 10 is an exemplary embodiment of a flow of cooling air in the lamp unit without utilization of an air direction element.

First, in considering of a case that there is no first air direction element 13, as shown in FIG. 10, air A0 fed into the opening 12 at the side of the lamp unit 11 is discharged mainly from an exhaust hole (a hole in which a mesh net is fit) of the glass holder 16 against which wind flows, after cooling the light source lamp (particularly, the end portion 21 of the light source lamp) approximately uniformly.

Then, assuming that the both are cooled to be about 300° C., the air A0 is sufficient cooling means for the light source lamp (about 400° C. and below), however, the air A0 is undesirable means for the front glass (about 200° C. and below). At the same time, the leg portion 22 of the light source lamp 20 is located at the back side of the reflector 18 that is getting narrower toward the end, so that it is difficult for the leg portion 22 to be cooled, compared with the end portion 21 of the light source lamp 20.

Therefore, by inserting the first air direction element 13 in the vicinity of the opening 12 as shown in FIG. 3 and FIG. 9, the cooling air from the second opening of the lamp unit is divided into cooling air A11 of a first direction and cooling air A12 of a second direction.

Thereby, cooling effects of the end portion 21, the leg portion 22, and the reflector 18 of the light source lamp 20 can be improved by the cooling air A12 of a second direction, which is not present positively in FIG. 10, and as a result, for example, the end portion 21 of the light source lamp 20 can be in the range of 300 to 400° C. and the leg portion 22 can be in the range of 700 to 900° C.

On the other hand, according to the cooling air A11 of a first direction, as compared to the case shown in FIG. 10, for example, the amount of the cooling air A11 directly flowing to the front glass 15 is not changed from the cooling air A1 so much. Therefore, a temperature of the front glass 15 can be the optimal value, for example, about 200° C. and below.

In the meantime, various temperatures are desired at respective portions and it is difficult to specify actual flow of the cooling air flatly, so that the optimum position is decided by measuring the actual temperature while adjusting the temperature depending on the set position and direction of the air direction element 13 as the dividing member. Such adjustment of the optimum temperature is derived from at least setting the first air direction element 13 as the dividing member (or the second air direction element 14) and it indicates an operational advantage on the basis of a property of the present embodiment.

In addition, the first air direction element 13 has holding arm portions at its opposite ends and the main body of the first air direction element 13 can be fixed without interrupting the opening 12 at the side of this first air direction element 13 at an inner vertical position of the glass holder 16.

B. Shape of Air Direction Element

Figure 4A:
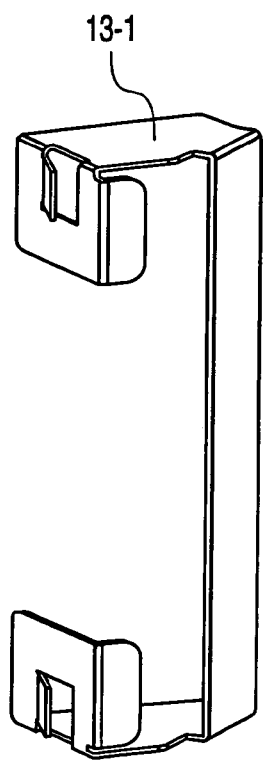
FIGS. 4A to 4C are exemplary embodiments an air direction element of the lamp unit for the projector-type display apparatus of FIG. 1.
Figure 4B:
Figure 4C:
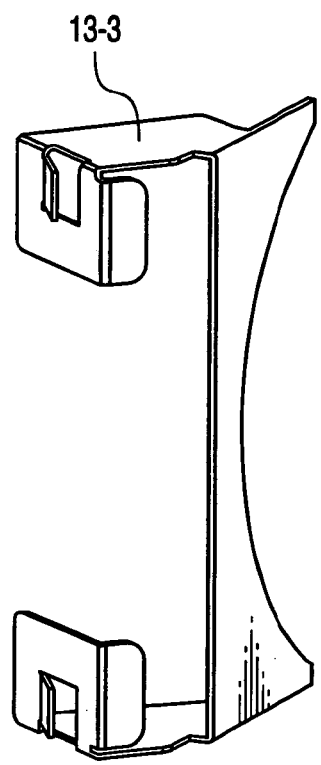

According to another embodiment, a shape of the first air direction element 13 is changed from the shape shown in FIG. 4A into the shape of an air direction element 13-2 shown in FIG. 4B or the shape of an air direction element 13-3 shown in FIG. 4C.

In other words, the air direction element 13-1 has plane faces. However, the air direction element 13-2 has curved shape faces just like arc.

In other words, the reflector 18 is shaped like a bowl upside down and the light source lamp is projected from its root just like a pistil of a tulip. Therefore, a flow in the vicinity of the leg portion 22 of the light source lamp 20 in the air blown from the opening 12 makes a far longer flow path as compared to a flow path at the rear side of the front glass 15. However, a center of axis of the light source lamp is made narrow by this curved shape of the element 13-2 and the flowing speed of the air is increased, so that the neighborhood of the leg portion 22 of the light source lamp is easily cooled.

In addition, in the same way, according to the air direction element 13-3, its flat plain shape is not changed and a width is only changed, the light source lamp is narrow at the center of axis and is wider as being far from the center of axis.

It is because when cooling the front glass 15 more, if the width in the vicinity of the upper and lower ends of the front glass 15 is made wider without changing a condition of the air direction element at the center of axis of the light source lamp 20, the flowing path is placed restrictions by the air direction element for a long period by just that much and the flowing path functions to cool the upper and lower ends of the front glass more as compared with a position (a center part) of the center of axis of the front glass. As described later, a mass of the front glass 15 is large, so that a high heat is transmitted from a center part of the front glass to a low heat of the upper and lower ends, and as a result, there is an advantage to cool the front glass 15 entirely.

According to the air direction element 13-3, its flat plain shape is not changed and a width is only changed, the light source lamp is narrow at the center of axis and is wider as being far from the center of axis. So, the air direction element 13-3 does not prevent the reflection light oft the reflector Due to these configurations, without interrupting irradiation of the light from the light source lamp 20 and increasing an area of the air direction element as much as possible, a control advantage of the cooling air can be made large.

In addition, by further combining various shaped air direction elements, it is possible to freely change the air direction, the air amount, and the air speed.

C. Second Air Direction Element 14

Figure 11:
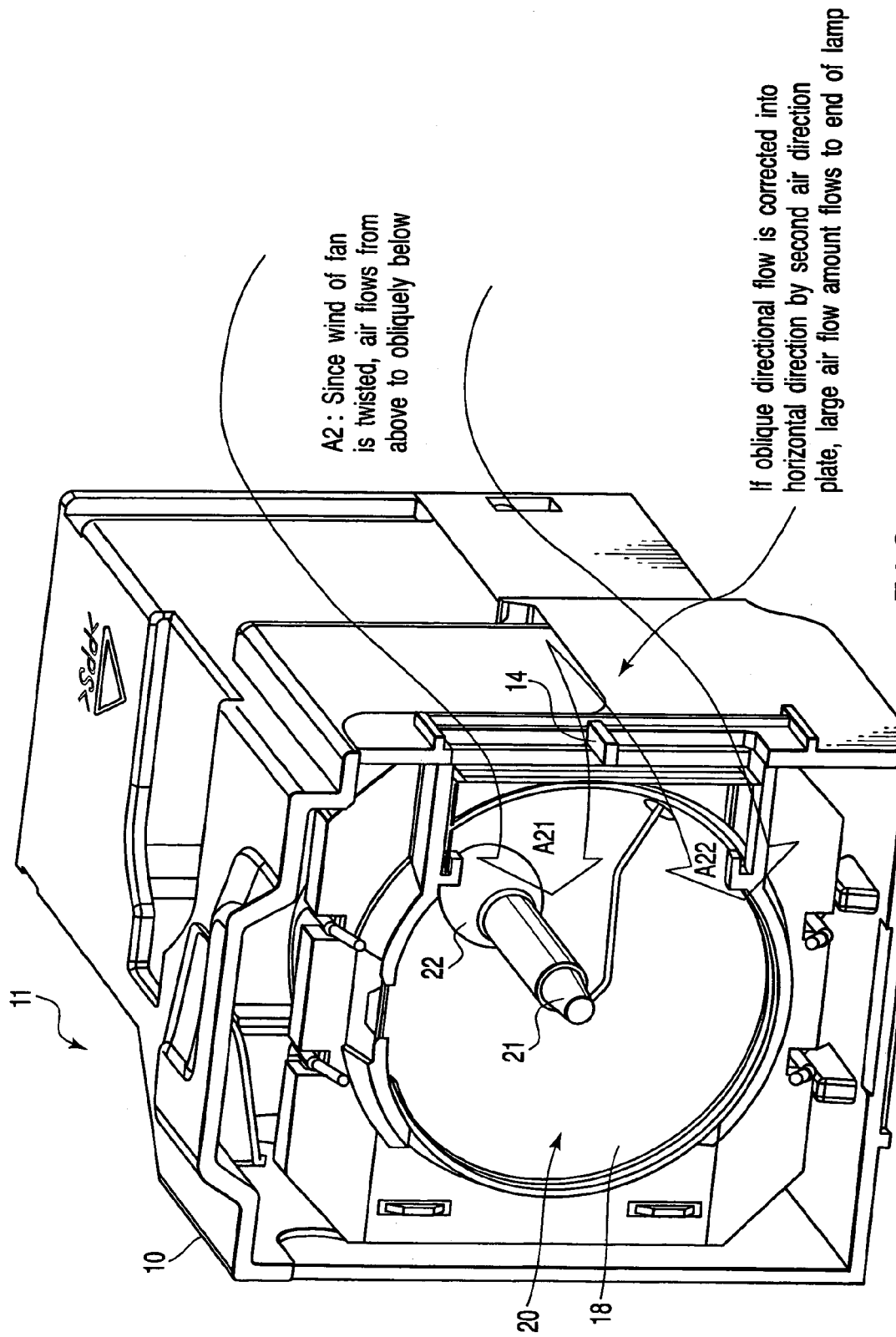

In addition, as shown in FIG. 3, FIG. 5, and FIG. 11, the second air direction element 14 is configured in such a manner that a longitudinal direction of the air direction element 14 is in parallel with a lateral direction, namely, an irradiation direction of the light of the light source lamp 20.

Figure 12:
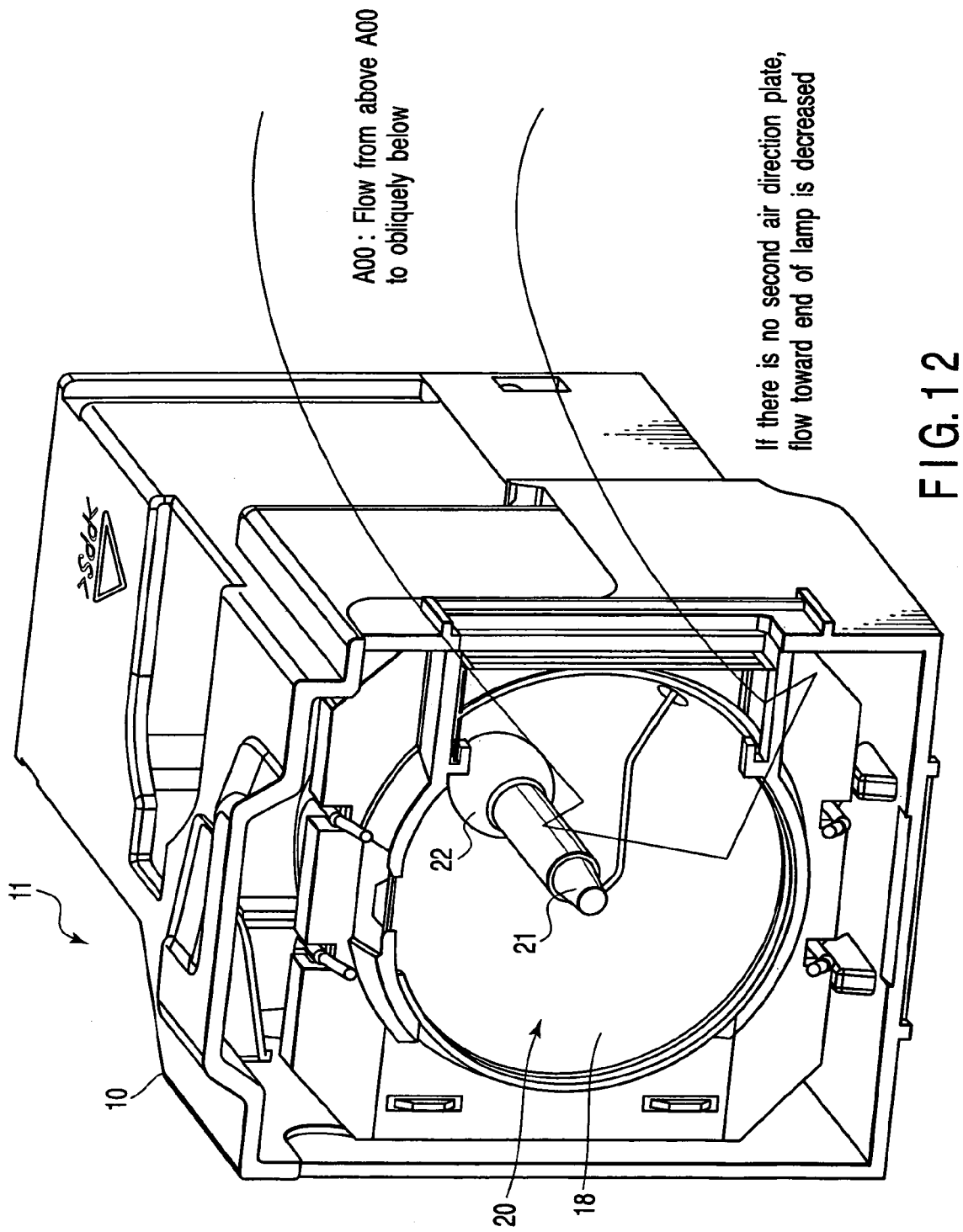
FIG. 12 is a perspective view of an exemplary embodiment of the lamp unit for explaining a flow of cooling air in the lamp unit without utilization of an air direction element.

By forming the second air direction element 14 in such a direction, the cooling air A2 shown in FIG. 11 blows from the duct as wind blowing from above to obliquely below since wind of the fan is originally twisted as the cooling air A00 shown in FIG. 12. If this situation remains as it is, as the cooling air A00 shown in FIG. 12, without sufficiently cooling the end portion 21 and the leg portion 21 of the light source lamp 20, flowing downward, the cooling air A2 tends to escape from the opening 24 as an exhaust port.

Therefore, by providing the air direction element 14 in a so-called lateral direction, at least, flow of the cooling air A21 shown in FIG. 11 is changed and the cooling air A21 sufficiently reaches the end portion 21 and the leg portion 22 of the light source lamp 20 so as to cool them.

Thus, the second air direction element 14 serves to control so-called a lateral direction of the cooling air, and particularly, by using it together with the first air direction element 13, it is possible to efficiently cool the light source lamp 20 by guiding the cooling air to a desired place.

IV. Exposure Structure of Cut Surface of Front Glass

In addition, as shown in FIG. 5, it is preferable that a cut surface of the front glass 15 is located as exposed in the casing 10 of the lamp unit 11 where the cooling air is blowing. In other words, the front glass 15 is located in the casing 10 so that a part of a cut surface 15-1 locating at an opening hole at the side of the lamp unit 11 in the cut surface of the front glass 15 is directly exposed to the cooling air to be fed. Thereby, it is possible to further improve a cooling effect of the front glass 15.

(Material of Glass Holder and Radiation Fin)

In addition, defining a material of the glass holder 16 as the holding member of this front glass 15 as a metal material (generally, a die-cast molding made of such as aluminum, zinc, Mg or the like), and further integrally molding a radiation fin on this glass holder, a radiation advantage is preferably improved. In addition, also by applying chromatic processing or chromatic alumite processing on the surface of the glass holder 16 made of a metal material, the radiation advantage can be enhanced.

(Control of Direction of Air by Mesh Net)

Figure 13A:
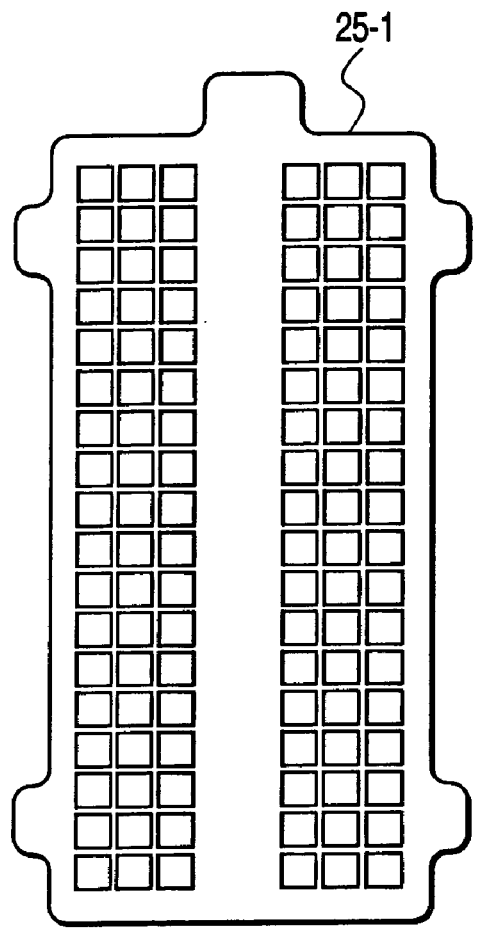
FIGS. 13A to 13B are exemplary embodiments of a mesh net used by the lamp unit according to the embodiment.
Figure 13B:
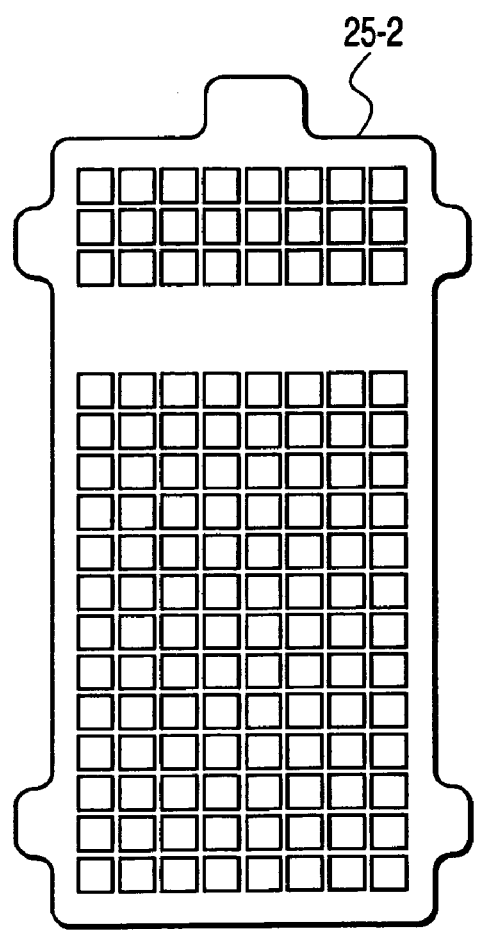

Further, also by mesh nets 25-1 and 25-2 as shown in FIG. 13A and FIG. 13B to be attached to the opening 12, it is possible to control a direction of the cooling air. In this case, for example, in the mesh net 25-1, by arranging the dividing member for the cooling air in a longitudinal direction to an appropriate place, for example, an advantage similar to the advantage of the first air direction element 13 is generated. In the same way, in the mesh net 25-2, by arranging the dividing member for the cooling air in a lateral direction to the appropriate place, for example, an advantage similar to the advantage of the second air direction element 14 is generated.

V. Control of Air Direction by Duct.

Figure 14:
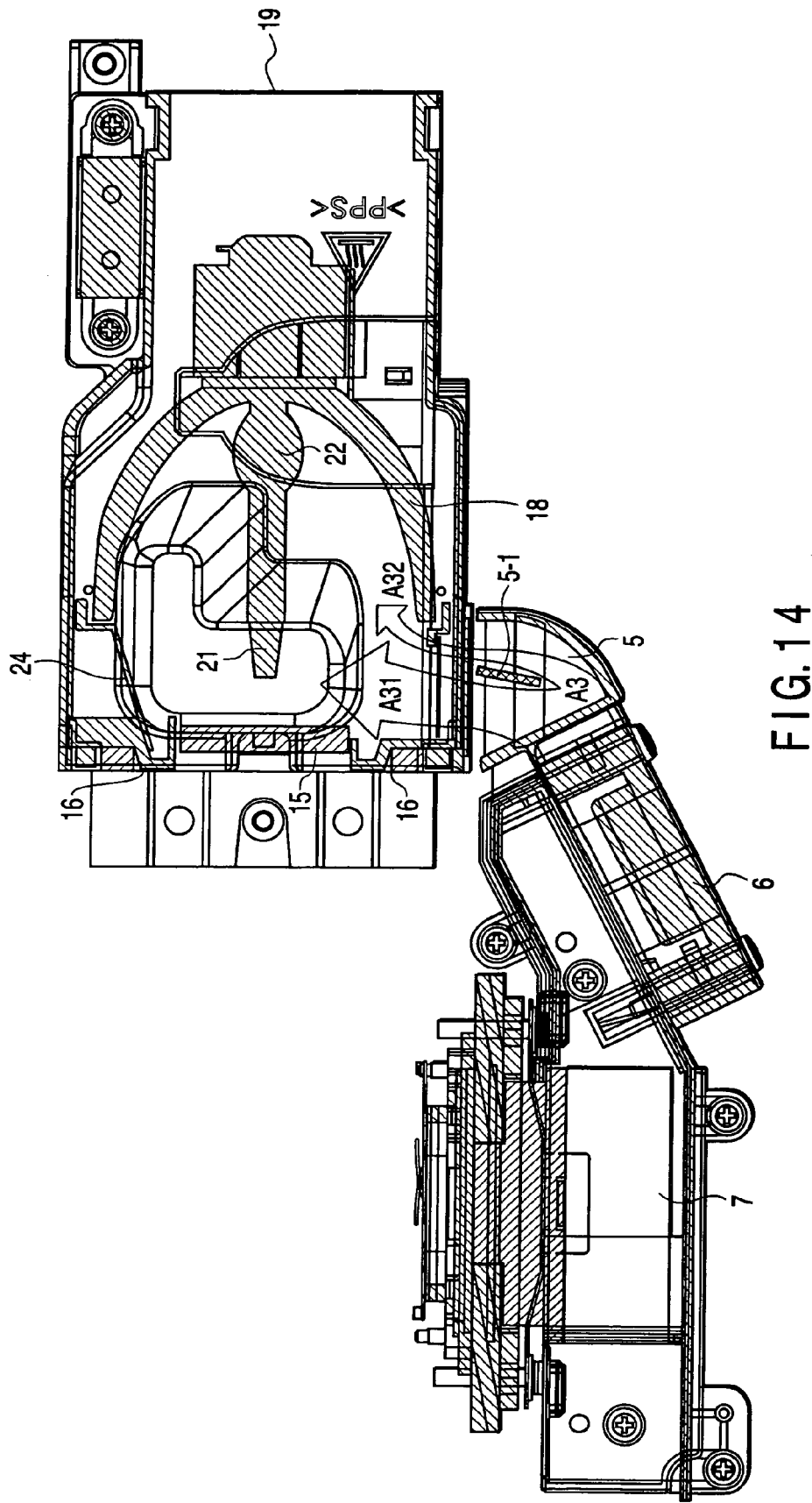
FIG. 14 is a view for explaining connection between the lamp unit and the duct unit according to the embodiment.

Further, as shown in FIG. 14, according to this embodiment, the same control of the air direction is carried out by providing the cooling air to the opening 12, but with the dividing member 5-1 provided inside of the lamp inlet duct 5. Also in this case, by making the direction of the dividing member into a longitudinal direction or a lateral direction as described above, further, by having two or more dividing members in the longitudinal direction and the lateral direction, a desired control of air direction is made possible and the selective cooling advantage to be required can be improved.

VI. Combination of Plural Methods for Controlling Air Direction

By not only carrying out the methods for controlling the air direction described above solely but also combining these methods efficiently, a desired cooling advantage can be acquired. Thereby, the present invention may provide a lamp unit capable of cooling finely, for example, cooling the end portion 21 of the power source lamp 20 by about 100° C. by further cooling the front glass 15 by 30° C. other than a conventional uniformed cooling of the lamp unit 11 and a projection-type display apparatus using the same.

In the meantime, the present invention is not limited to the above-described embodiment as it is and the present invention may be embodied in other specific forms without departing from the spirit or characteristics thereof. In addition, by appropriately combining a plurality of constituent elements disclosed in the above-described embodiment, various inventions can be made. For example, some constituent elements from among all constituent elements disclosed in the embodiment may be deleted. Further, the constituent elements according to a different embodiment may be appropriately combined.

What is claimed is:

1. A lamp unit comprising:
a light source lamp;
a casing configured to hold the light source lamp, the casing including a first opening operating as an inlet port where cooling air is fed from the outside to the light source lamp; and
a dividing member positioned proximate to the first opening of the casing and is configured to divide the flow of the cooling air into the first opening into two paths, the dividing member includes an air direction element provided inside the casing and positioned substantially parallel to an irradiation direction of light of the light source lamp.

2. A lamp unit according to claim 1, further comprising a reflector to reflect light from the light source lamp.

3. A lamp unit according to claim 2, wherein the casing further includes a second opening through which the light from the light source lamp is radiated.

4. A lamp unit according to claim 3, wherein the dividing member includes a second air direction element provided inside the casing and positioned substantially perpendicular to an irradiation direction of the light of the light source lamp.

5. A lamp unit according to claim 3, further comprising a glass member, which is provided at the second opening of the casing and of which glass face is configured to be provided at an angle so as to have a non-normal intersection with a direction of the light from the light source lamp.

6. A lamp unit according to claim 5, wherein the glass member is provided to the casing at a position where the cooling air from the first opening directly flows to a cut surface with the cut surface exposed.

7. A lamp unit according to claim 1, wherein the dividing member includes a mesh net to be provided at the first opening, the mesh net includes a portion to prevent the cooling air from passing in a direction in parallel to the irradiation direction of the light of the light source lamp.

8. A lamp unit according to claim 1, further comprising:
a duct coupled to the first opening of the casing in order to route the cooling air to the first opening, the duct being implemented with the dividing member.

9. A lamp unit comprising:
a light source lamp;
a casing configured to hold the light source lamp the casing including a first opening operating as an inlet port where cooling air is fed from the outside to the light source lamp; and
a dividing member positioned proximate to the first opening of the casing and is configured to divide the flow of the cooling air into the first opening into two paths, the dividing member includes an air direction element provided inside the casing and having a curved portion substantially perpendicular to an irradiation direction of light from the light source lamp.

10. A lamp unit comprising:
a light source lamp;
a casing configured to hold the light source lamp the casing including a first opening operating as an inlet port where cooling air is fed from the outside to the light source lamp; and
a dividing member positioned proximate to the first opening of the casing and is configured to divide the flow of the cooling air into the first opening into two paths, the dividing member includes an air direction element provided inside the casing and positioned substantially perpendicular to an irradiation direction of light from the light source lamp, the air direction element being configured with an end portion having a width wider than a width of a center portion of the air direction element.

11. A lamp unit comprising:
a light source lamp;
a casing configured to hold the light source lamp the casing including a first opening operating as an inlet port where cooling air is fed from the outside to the light source lamp; and
a dividing member positioned proximate to the first opening of the casing and is configured to divide the flow of the cooling air into the first opening into two paths, the dividing member includes a mesh net to be provided at the first opening, the mesh net includes a portion to prevent the cooling air from passing in a direction perpendicular to the irradiation direction of light of the light source lamp.

12. A projection-type display apparatus comprising:
a light source lamp;
a casing surrounding the light source lamp, the casing including a first opening operating as an inlet port for cooling air routed to the light source lamp;
a dividing member positioned proximate to the first opening of the casing and configured to divide the flow of the cooling air into the first opening into two paths with a first path directed to the light source lamp, the dividing member includes an air direction element provided inside the casing and adapted to be substantially parallel to an irradiation direction of light of the light source lamp; and
a projection portion adapted to project an optical image produced using the light from the light source lamp.

13. A projection-type display apparatus according to claim 12, further comprising a reflector to reflect light from the light source lamp.

14. A projection-type display apparatus according to claim 13, wherein the casing further includes a second opening through which the light from the light source lamp is radiated.

15. A projection-type display apparatus according to claim 12, wherein the dividing member includes a second air direction element provided inside the casing and adapted to be substantially perpendicular to an irradiation direction of the light of the light source lamp.

16. A projection-type display apparatus according to claim 14, further comprising a glass member provided at the second opening of the casing and a face of the glass member is configured at a tilted angle so as to have a non-normal intersection with a direction of the light from the light source lamp.

17. A projection-type display apparatus according to claim 16, wherein the glass member is positioned within the casing so the cooling air from the first opening directly flows to a cut surface of the glass member having the cut surface exposed.

* * * * *